United States Patent [19]

Dudovicz

[11] Patent Number: 5,571,223
[45] Date of Patent: Nov. 5, 1996

[54] ROLLER APPARATUS

[75] Inventor: Walter Dudovicz, Salem, N.H.

[73] Assignee: Scapa Group PLC, Blackburn, United Kingdom

[21] Appl. No.: 90,685

[22] Filed: Jun. 22, 1993

[51] Int. Cl.$^6$ .................................................. D06F 58/00
[52] U.S. Cl. .................... 34/110; 34/111; 34/128; 34/626; 156/207; 156/244.27; 156/555
[58] Field of Search .................... 34/110, 155, 41, 34/12, 163, 624, 611, 454, 444, 455, 456, 457, 458, 399, 70; 38/44, 45, 52, 55, 57

[56] References Cited

U.S. PATENT DOCUMENTS

| | | | |
|---|---|---|---|
| 1,504,218 | 8/1924 | Crowell | 156/207 |
| 2,219,065 | 10/1940 | Bruker et al. | 156/555 |
| 2,679,572 | 5/1954 | Workman | 34/110 X |
| 3,401,439 | 9/1968 | Staats et al. | 219/244 |
| 3,804,688 | 4/1974 | Hillenbrand et al. | 156/205 |
| 4,639,292 | 1/1987 | Ota et al. | 34/110 X |
| 4,887,340 | 12/1989 | Kato | 492/53 |
| 5,121,560 | 6/1992 | Daane et al. | 34/110 X |

FOREIGN PATENT DOCUMENTS

| | | |
|---|---|---|
| 0 083 301 | 10/1982 | European Pat. Off. . |
| 3932963 A1 | 4/1991 | Germany . |
| 2-110045 | 4/1990 | Japan . |
| 1264549 | 2/1972 | United Kingdom . |
| 1557892 | 12/1979 | United Kingdom . |
| 2039342 | 8/1980 | United Kingdom . |
| 2057092 | 3/1981 | United Kingdom . |

Primary Examiner—Henry A. Bennett
Assistant Examiner—Steve Gravini
Attorney, Agent, or Firm—Keck, Mahin & Cate

[57] ABSTRACT

A roller apparatus (23) for use in the drying section of an apparatus for producing corrugated board comprises a tubular body operative to be received over a metal roller. The wall of the tubular body comprises an inner layer (24) of relatively hard polyurethane and an outer layer (25) of a deformable polyurethane. A spiral winding of yarn (26) is wrapped around the inner layer (24).

13 Claims, 3 Drawing Sheets

ROLLER APPARATUS

The present invention relates to a roller apparatus for use in the drying section of apparatus for producing corrugated board.

Probably the most common form of corrugated board is double faced board which comprises a single layer of fluting medium with a single sheet of liner provided on the upper and lower faces thereof. Other types of corrugated board are well known in the art, examples of which include single faced board, double walled board and triple walled board.

Much of the machinery for making corrugated board operates on a "continuous run" principle to optimise space and to ensure uniformity of the finished product whilst minimising wastage.

The process for producing double faced board begins with the fluting medium being plasticised by a combination of a heated roller and steam showers. It then passes between a pair of rollers featuring the flute profile, the corrugations are formed and adhesive is applied to the flute tips. At the same time the first liner sheet, normally the inner—is drawn from a roll, passed through a series of heated rollers and is laminated to the fluting by a single facer unit. The resultant continuous stream of single faced paper is conveyed up into and over a bridge en route to the double backer unit. At the double backer, adhesive is applied to the exposed flute tips and a second web of pre-heated liner is brought into contact with the fluting as the two materials pass between a heated table and a "blanket" belt conveyor. Here, pressure and heat are applied to speed the bonding of the two elements. The adhesive applied to the flute tips is generally water-based. Steam is generated when the heat is applied. The steam ultimately corrodes the metal rollers.

The board then passes to a drying section. At the drying section the board passes over a series of hot plates. The board is urged into contact with the hot plates via an endless belt. Metal weight rollers are located on the surface of the belt which is remote from the board for urging the belt towards the board. Flute crushing can occur at the drying section as each of the weight rollers transmits a high point load to the flute.

The belts at the dryer section are generally not produced in endless form, but as a length of material with co-operating clips or other materials provided at the ends thereof. These clips are used to join the two ends of the belt together so as to provide an endless structure. If exposed, a metallic seam can result in noisy roll bounce as it passes under the metal rollers.

The present invention has been made from a consideration of these problems.

According to a first aspect of the present invention there is provided a roller apparatus for use in the drying section of apparatus for producing corrugated board, said roller apparatus comprising a tubular body, the tubular body comprising a cylindrical wall defining an aperture extending therethrough, the aperture being operative to receive a rotatable metal roller, wherein the outermost region of the cylindrical wall comprises at least one layer of deformable material.

According to a second aspect of the present invention there is provided the use of a roller apparatus in the drying section of apparatus for producing corrugated board, said roller apparatus comprising a tubular body, the tubular body comprising a cylindrical wall defining an aperture extending axially therethrough, the aperture being operative to receive a rotatable metal roller, wherein the outermost region of the cylindrical wall comprises at least one layer of deformable material.

According to a third aspect of the present invention there is provided a drying apparatus for use in the production of corrugated board said drying apparatus comprising at least one heater for heating the corrugated board, a movable belt for driving the board over the said heaters and at least one roller apparatus located on the side of the belt remote from the heaters, wherein said roller apparatus comprises a tubular body, the tubular body comprising a cylindrical wall defining an aperture extending therethrough, the aperture being operative to receive a rotatable metal roller, wherein the outermost region of the cylindrical wall comprises at least one layer of deformable material.

The deformable material is preferably a plastics material such as polyurethane and/or an elastomeric material such as rubber.

The roller apparatus of the present invention can be fitted over weight rollers provided in the dryer sections of existing machinery for making corrugated board. Such roller apparatus increase the diameter of the rollers without significantly increasing their weight. The larger diameter coupled with the compressible surface layer of the roller apparatus increases the impression on the belt providing a more uniform applied pressure than known rollers and furthermore allows the roller to better conform to hot plate surface irregularities. This results in better heat transfer to the board allowing faster operating speed and more consistent board quality.

The damping effect provided by the outer surface layer also reduces bounce which reduces bearing wear.

In a preferred embodiment of the invention the cylindrical wall comprises two layers. The inner layer is preferably relatively hard for continuous contact with the roller. It also provides excellent stability against the effects of centrifugal force. The outer surface layer is relatively soft to give excellent damping and increased roll contact with contoured surfaces. Furthermore roll bounce is eliminated so as to reduce noise levels.

The inner and outer layers may suitably comprise polymers such as polyurethane.

The Shore A hardness of the outer layer is preferably in the range from 25 to 50 and more preferably from 30 to 45. The Shore A hardness of the inner layer is preferably in the range from 40 to 95 and more preferably from 45 to 90.

The thickness of the inner layer is preferably in the range from 0 to 15 and is more preferably about 9 mm. The thickness of the outer layer is preferably in the range from 5 mm to 20 mm and is more preferably substantially 10 mm. The diameter of the roller apparatus is preferably at least 80 mm and is more preferably in the range from 80 mm to 110 mm.

The roller apparatus may be made by casting or any other suitable method. A plurality of roller apparatus may be received on a single metal roller.

The roller apparatus preferably further comprises a reinforcing structure. This may comprise a fabric or yarn which is ideally located between the inner and outer layers of the cylindrical wall so as to stop the inner layer from becoming distorted. The reinforcement ideally comprises a yarn which is wound in a spiral manner. The reinforcement stabilises the rollers against the effect of centrifugal force and minimises the effect of failure in the event of an outer surface tear. If the reinforcement was not provided the roller apparatus would blow apart if there were to be a severe cut on the outer surface of the apparatus.

In order that the present invention may be more readily understood a specific embodiment thereof will now be described by way of example only with reference to the accompanying drawings in which.

Figure 1:
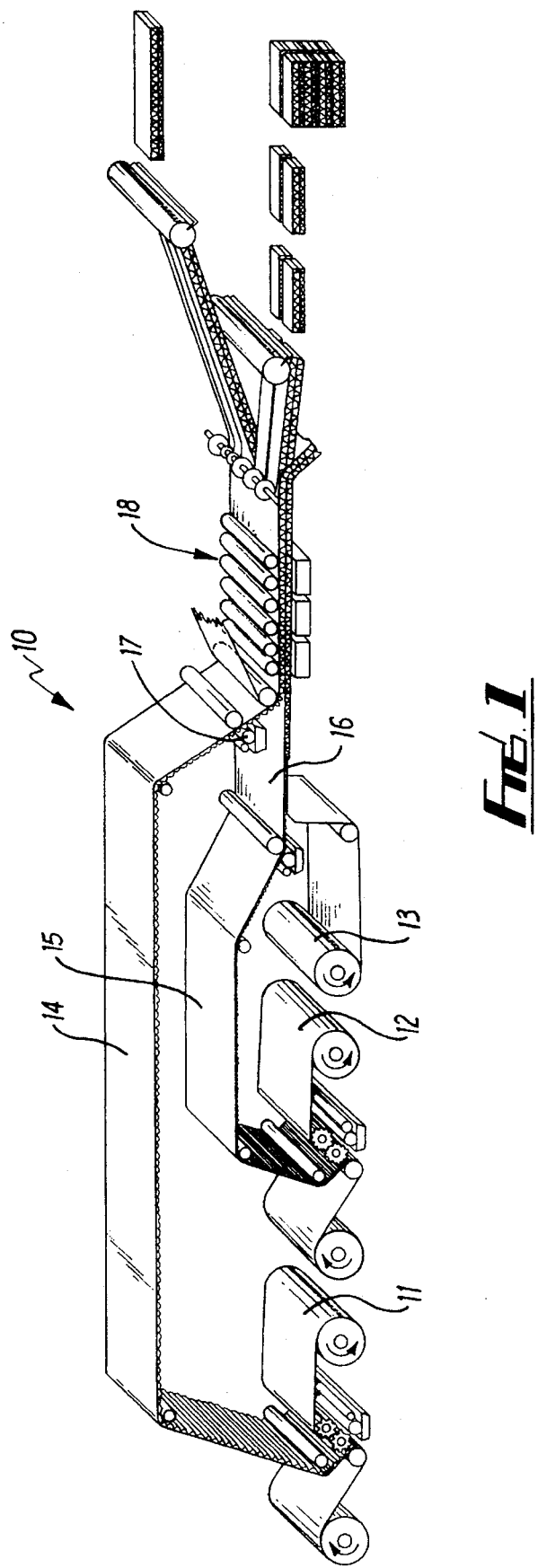
FIG. 1 shows an apparatus for making corrugated board.
Figure 2:
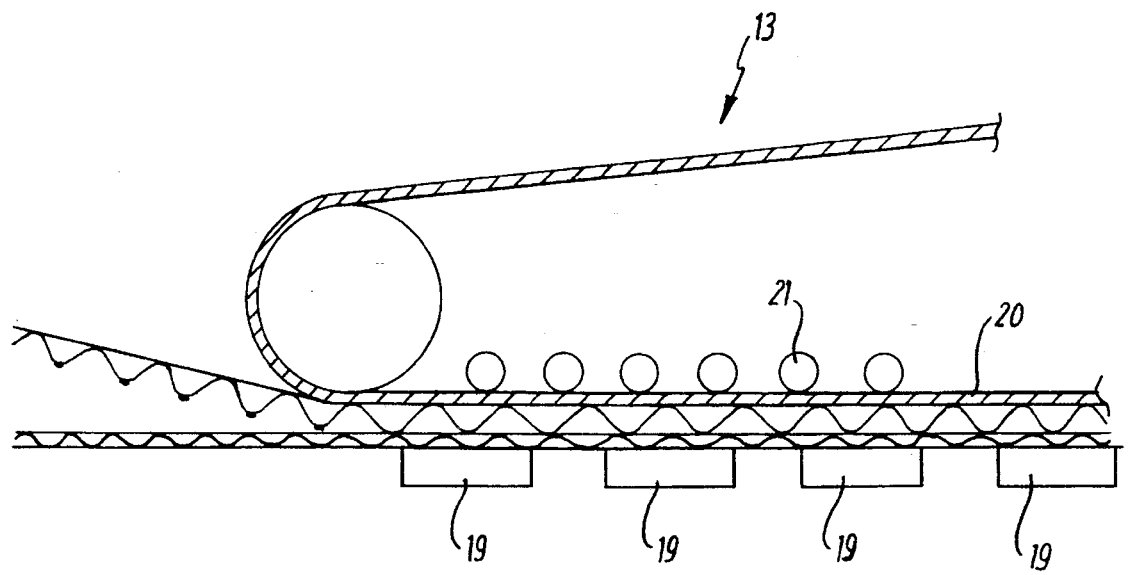
FIG. 2 shows the drying section of the apparatus of FIG. 1.
Figure 3:
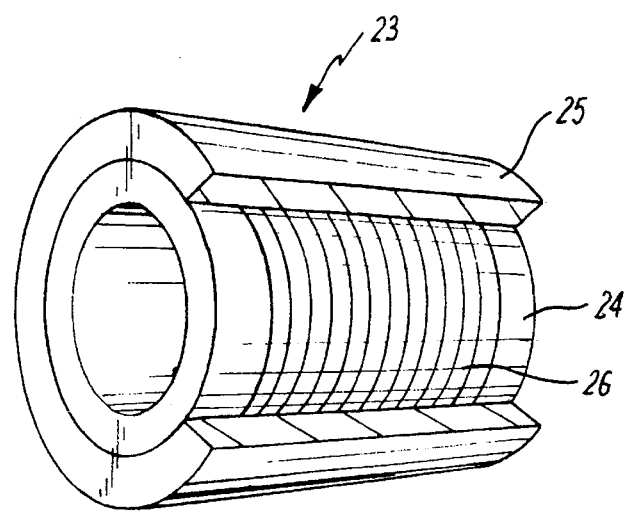
FIG. 3 shows one roller apparatus in accordance with the present invention.
Figure 4:
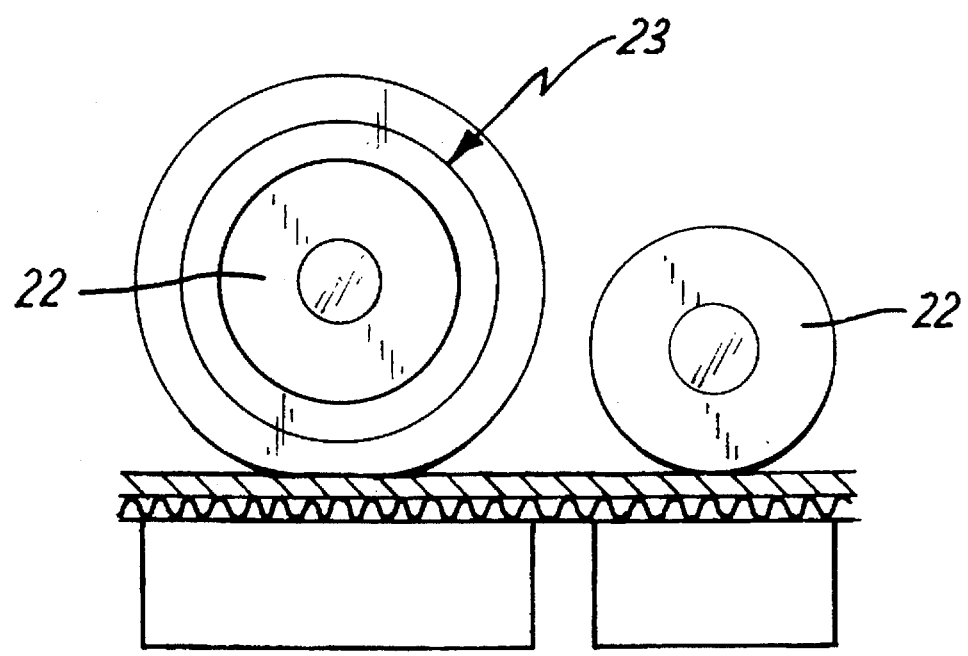
FIG. 4 is a side elevation of the roller apparatus of FIG. 3 alongside a known roller apparatus.

Referring to the drawings a typical apparatus 10 for making double walled corrugated board comprises single facer units 11,12 and double backer unit 13. A first fluted sheet is bonded to a flat liner sheet at the first single facer unit 11 so as to provide a first laminate 14. Similarly a second fluted sheet is bonded to a second flat liner sheet at the second facer unit 12 so as to provide a second laminate 15. The second laminate 15 passes to the double backer unit 13 at which a flat liner sheet is bonded to the other side of the fluted sheet so as to provide a double faced board 16. The flute tips of the fluted side of the first laminate 14 are then coated with adhesive by an applicator roller 17 and the first laminate 14 is bonded to the double faced board 16. The resultant double walled board then passes through a dryer unit 18. The dryer unit 18 is shown in more detail in FIG. 2. At the dryer unit 18 the double faced board 16 travels over hot plates 19. Part of an endless belt 20 is in contact with the side of the board 16 which is remote from the dryer units so as to urge the board towards the dryer units. A plurality of roller apparatus 21 are provided on the face of the belt which does not make contact with the board. The rollers comprise a metal bar 22 over each of which are located a number of short cylindrical sleeve units 23. About 5 to 8 cylindrical sleeves are provided along the length of the metal bar 22, depending on the machine width. The manufacture of short tubular roller units rather than a single tubular unit is considered preferable as damage of a single short unit will only necessitate replacement of a small part of the roller structure. Furthermore relatively small units are easier to make by the preferred method of manufacture which is casting.

The cylindrical sleeve 23 comprises a hard polyurethane inner core 24 which gives stability and firm contact with the roller surface and a deformable polyurethane outer surface layer 25 which absorbs vibrations, reduces roller bounce and bearing wear. A length of yarn 26 is spirally wound around the inner core so as to prevent the inner core from becoming distorted. The diameter of the sleeve is about 9 cms. In use the outer polyurethane layer spreads so as to provide a flat "footprint" thus avoiding crushing and marking of the board. Also the use of a larger diameter sleeve without a significant increase in weight as would be associated with a larger metal roller increases the impression on the belt without crushing the belt. The larger spread of pressure associated with the spread roller effect provides more time for the heat to affect the starch/adhesive.

Suitable materials for the inner and outer layer include polyurethane. The hardness of the layers can be selected to balance performance and endurance. Suitable combinations are set out below.

| Shore A Durometer Combinations | |
|---|---|
| Inner/Outer | Inner/Outer |
| 90/30 | 90/45 |
| 60/30 | 60/45 |
| 45/45 | |

| Material Specifications Material: Thermoset Polyurethane | | | | |
|---|---|---|---|---|
| | Durometer | | | |
| | 90 | 60 | 45 | 30 |
| 100% Modulus | 1400 | 1100 | 950 | 800 |
| 300% Modulus | 2600 | 2040 | 1770 | 1485 |
| Bashore Rebound % | 41 | 33 | 30 | 28 |
| Compression Set Method B | 33 | 26 | 23 | 20 |

The tubular roller apparatus of the present invention is preferably made by casting. An example roller is manufactured in the following manner.

A polyether prepolymer is mixed with a diamine curative to produce a 90 Shore A product. The mixture is then poured into an open casting mold and cured to a "green state". The cure time should be long enough to allow the material to solidify yet brief enough so that sufficient isocyanate ends are available for future bonding. The outer cylinder is removed, and the casting is wiped with solvent in order to remove mold release and further soften the material.

Nylon yarn (1260 denier/4 ply) is wound under tension in a spiral, 8 threads per inch, and is set in from both sides of the casting by approximately ½ inch (12.7 mm). This procedure is performed in order to eliminate any chance of moisture attacking the textile spiral.

The mold is reassembled with a larger outer cylinder and reheated. Polyester prepolymer is mixed with a TMP based triol curative to produce a 30 Shore A product. The mixture is poured into a cavity between a 90A casting wound with cords, and an outer cylinder. The mold is then struck with rubber hammers in order to dislodge air bubbles trapped under the spiral winding of yarn. The mold is placed in an oven for 16 hours. The mold is subsequently removed from the oven, cooled and the casting is removed from the mold. The casting is then trimmed on both sides.

It is to be understood that the above described embodiment is by way of illustration only. Many modifications and variations are possible.

I claim:

1. A roller apparatus for use in the drying section of apparatus for producing corrugated board, said roller apparatus comprising a tubular body, the tubular body comprising a cylindrical wall defining an aperture extending therethrough, the aperture being operative to receive a rotatable metal roller, wherein the cylindrical wall comprises an inner layer consisting essentially of polymeric material and a relatively less hard outer layer, the outer layer comprising deformable material and wherein a reinforcing structure is provided at an interface between the inner layer and the outer layer.

2. A roller apparatus as claimed in claim 1, wherein the deformable material comprises at least one of a plastics material or an elastomeric material.

3. A roller apparatus as claimed in claim 1, wherein the outer layer has a Shore A hardness in the range from 25 to 50.

4. A roller apparatus as claimed in claim 1, wherein the outer layer has a Shore A hardness in the range from 30 to 45.

5. An apparatus as claimed in claim 1, wherein the inner layer has a Shore A hardness in the range from 40 to 95.

6. An apparatus as claimed in claim 1, wherein the inner layer has a Shore A hardness in the range from 45 to 90.

7. A roller apparatus as claimed in claim 1, wherein the thickness of the outer layer is in the range from 5 mm to 20 mm.

8. A roller apparatus as claimed in claim 1, wherein the thickness of the inner layer is equal to or less than 15 mm.

9. A roller apparatus as claimed in claim 1, wherein the diameter of the apparatus is at least 80 mm.

10. A roller apparatus as claimed in claim 9, wherein the diameter of the apparatus is in the range from 80 mm to 110 mm.

11. A roller apparatus as claimed in claim 1, wherein the reinforcing structure comprises fabric or yarn.

12. A drying section of apparatus for producing corrugated board comprising roller apparatus, said roller apparatus comprising a tubular body, the tubular body comprising a cylindrical wall defining an aperture extending therethrough, the aperture being operative to receive a rotatable metal roller, wherein the cylindrical wall comprises an inner layer consisting essentially of polymeric material and a relatively less hard outer layer, the outer layer comprising deformable material and wherein a reinforcing structure is provided at an interface between the inner layer and the outer layer.

13. A drying apparatus for use in the production of corrugated board, said drying apparatus comprising at least one heater for heating the corrugated board, a movable belt for driving the board over the said heaters and at least one roller apparatus located on the side of the belt remote from the heaters, wherein said roller apparatus comprises a tubular body, the tubular body comprising a cylindrical wall defining an aperture extending therethrough, the aperture being operative to receive a rotatable metal roller, wherein the outermost region of the cylindrical wall comprises at least one layer of deformable material as an outer layer, an inner layer thereof consisting essentially of polymeric material and a reinforcing structure being disposed at an interface between the inner layer and the outer layer.

* * * * *